United States Patent
Wu

(10) Patent No.: US 10,551,668 B2
(45) Date of Patent: Feb. 4, 2020

(54) LIQUID CRYSTAL DISPLAY PANEL WITH BORDER AREAS OF MINISCULE DIMENSIONS

(71) Applicant: SEAMLESS TECHNOLOGY INC., Taipei (TW)

(72) Inventor: I-Wei Wu, New Taipei (TW)

(73) Assignee: SEAMLESS TECHNOLOGY INC., Taipei (TW)

( * ) Notice: Subject to any disclaimer, the term of this patent is extended or adjusted under 35 U.S.C. 154(b) by 0 days.

(21) Appl. No.: 16/398,768

(22) Filed: Apr. 30, 2019

(65) Prior Publication Data

US 2019/0353959 A1 Nov. 21, 2019

Related U.S. Application Data

(60) Provisional application No. 62/673,142, filed on May 18, 2018.

(51) Int. Cl.
*G02F 1/1335* (2006.01)
*G02F 1/1333* (2006.01)

(52) U.S. Cl.
CPC .. *G02F 1/133603* (2013.01); *G02F 1/133305* (2013.01); *G02F 1/133605* (2013.01); *G02F 1/133606* (2013.01)

(58) Field of Classification Search
CPC ......... G02F 1/133603; G02F 1/133305; G02F 1/133605; G02F 1/133606
See application file for complete search history.

(56) References Cited

U.S. PATENT DOCUMENTS

| 5,673,128 | A | * | 9/1997 | Ohta | G02B 6/0018 349/62 |
| 5,808,708 | A | * | 9/1998 | Oyama | G02B 6/0018 349/65 |
| 9,052,545 | B2 | * | 6/2015 | Son | G02F 1/133615 |
| 9,075,175 | B2 | * | 7/2015 | Tsai | G02B 6/0036 |
| 2013/0050612 | A1 | * | 2/2013 | Hur | G02F 1/133603 349/62 |
| 2013/0163278 | A1 | * | 6/2013 | Wang | G02B 6/0031 362/606 |
| 2014/0307396 | A1 | * | 10/2014 | Lee | H05K 1/028 361/749 |
| 2015/0173172 | A1 | * | 6/2015 | Yang | G02F 1/1333 361/749 |
| 2017/0179423 | A1 | * | 6/2017 | Kwon | H01L 27/323 |

(Continued)

*Primary Examiner* — Mary Ellen Bowman
(74) *Attorney, Agent, or Firm* — ScienBiziP, P.C.

(57) ABSTRACT

A liquid crystal display device includes a display panel and a backlight module. The display panel includes a TFT substrate. The TFT substrate includes a base portion that is flat and an extending portion curvedly extending from a side of the base portion. A driving chip is positioned on the extending portion and electrically coupled to the TFT substrate. The backlight module includes a light guiding plate including a main portion that is flat and a bending portion curvedly extending from a side of the main portion. The main portion is laminated on a side of the base portion. The bending portion extends toward a direction away from the base portion. An end surface of the bending portion away from the main portion is a light-incident surface of the light guiding plate. A surface of the main portion facing and adjacent to the base portion is a light-emitting surface.

12 Claims, 3 Drawing Sheets

(56) References Cited

U.S. PATENT DOCUMENTS

2018/0088380 A1* 3/2018 Oka ................... G02B 6/0088
2018/0341142 A1* 11/2018 Choi .................. H01L 27/3246
2019/0072811 A1* 3/2019 Higano ............. G02F 1/133615

* cited by examiner

LIQUID CRYSTAL DISPLAY PANEL WITH BORDER AREAS OF MINISCULE DIMENSIONS

FIELD

The subject matter herein generally relates to a liquid crystal displays panel, especially relates to a liquid crystal display device having a narrow border.

BACKGROUND

A conventional liquid crystal display device generally includes a display area for displaying images and a border area surrounding the display area. In order to improve aesthetics and display effects of the display device, it is generally required that the display device have a narrow border area or maybe even a borderless display. Therefore, there is room for improvement in the art.

BRIEF DESCRIPTION OF THE DRAWINGS

Implementations of the present technology will now be described, by way of embodiment, with reference to the attached figures.

DETAILED DESCRIPTION

Figure 1:
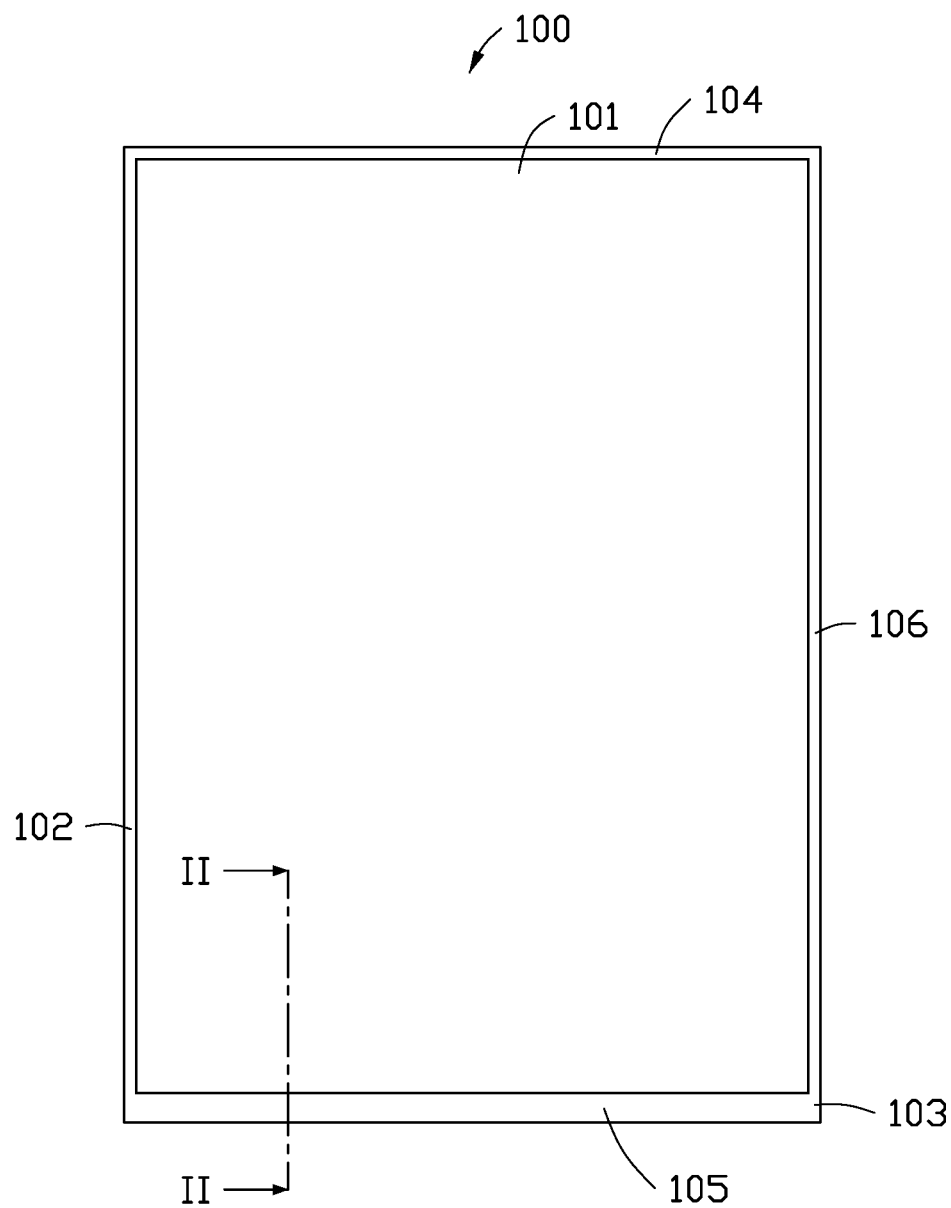
FIG. 1 is a bottom view of a liquid crystal display device according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "coupled" is defined as connected, whether directly or indirectly through intervening components, and is not necessarily limited to physical connections. The connection can be such that the objects are permanently connected or releasably connected. The term "comprising" when utilized, means "including, but not necessarily limited to"; it specifically indicates open-ended inclusion or membership in the so-described combination, group, series, and the like.

FIG. 1 illustrates a liquid crystal display device 100. The liquid crystal display device 100 defines a display area 101 for displaying images and a border area 103 surrounding the display area 101. The border area 103 does not display images. The border area 103 is divided into four portions, an upper border 104, a lower border 105, a left border 102, and a right border 106. The upper border 104 is usually on a top side of the display area 101 when the liquid crystal display device 100 is held normally, and the lower frame 105 is usually on a bottom side of the display area 101 when the liquid crystal display device 100 is held normally. The left border 102 is usually on a left side of the display area 101, and the right border 106 is usually on a right side of the display area 101 when the liquid crystal display device 100 is held normally.

A left border and a right border of a conventional liquid crystal display device (not shown) are generally narrow. A lower border generally has a wider width (an extended width of the lower border toward the display area). Components, such as a driving chip (not shown) may be located in the lower border. A shielding ink (not shown) is usually located in the border area 103 to shield from view components such as the driving chip.

Figure 2:
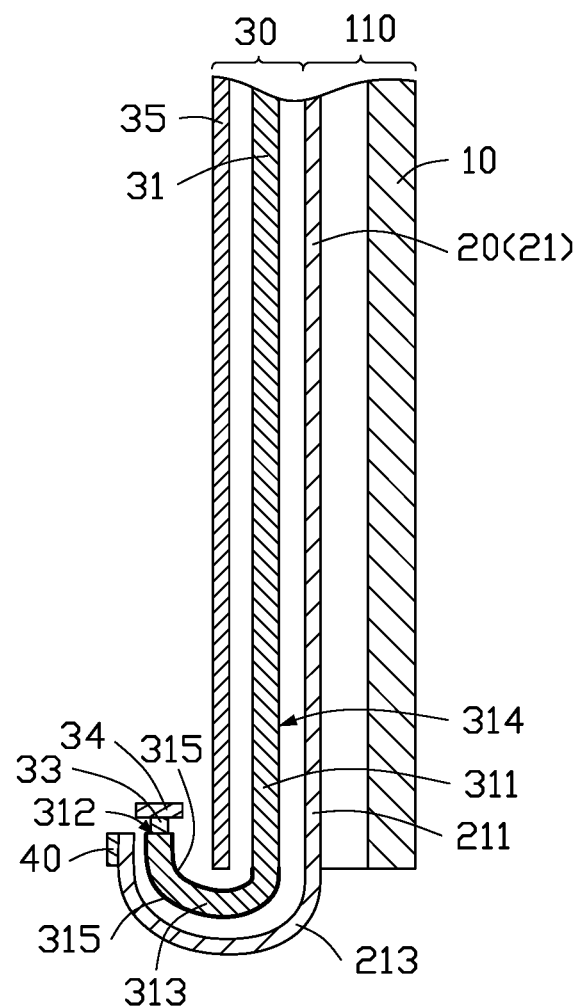
FIG. 2 is a cross-sectional view along line II-II of FIG. 1.

In the present embodiment, as shown in FIG. 1, a width of the lower border 105 is narrower. Referring to FIG. 2, the liquid crystal display device 100 includes a display panel 110 and a backlight module 30 stacked under the display panel 110. The display panel 110 includes a color filter substrate 10, a thin film transistor (TFT) substrate 20 facing the color filter substrate 10, and a liquid crystal layer (not shown) between the color filter substrate 10 and the TFT substrate 20. The backlight module 30 is adjacent to the TFT substrate 20.

The TFT substrate 20 includes a transparent substrate 21 and a plurality of TFTs (not shown) and other components (not shown) formed on the transparent substrate 21. The backlight module 30 includes a light guiding plate 31, a plurality of light emitting diodes (LEDs) 33, a reflective sheet 35, and other conventional components in the art, such as optical films (not shown).

As shown in FIG. 2, the light guiding plate 31 is flexible. A conventional light guiding plate is generally made of polyethylene terephthalate (PET), but flexibility of the PET material is limited, so the light guiding plate 31 is often made of other flexible materials, such as polyimide. As shown in FIG. 2, the light guiding plate 31 includes a main portion 311 that is flat and a bending portion 313 which is bent. The bending portion 313 extends from a side of the main portion 311 and curvedly extends toward a direction away from the color filter substrate 10. The reflective sheet 35 is on a side of the main portion 311 of the light guiding plate 31 away from the color filter substrate 10. The bending portion 313 of the light guiding plate 31 extends to a side of the reflective sheet 35 away from the color filter substrate 10 by curving. The light guiding plate 31 includes a light-incident surface 312 and a light-emitting surface 314. The light-incident surface 312 is an end surface of the bending portion 313 away from the main portion 311. The light-emitting surface 314 is a surface of the main portion 311 facing the TFT substrate 20.

Figure 3:
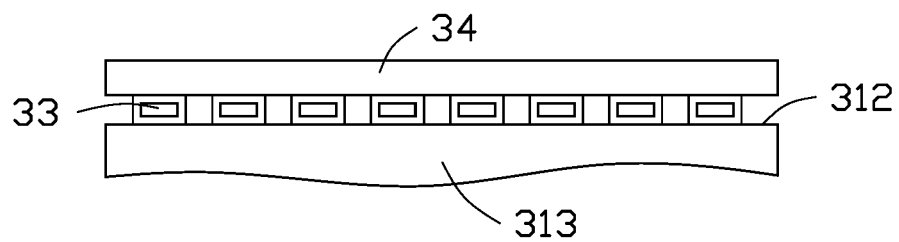
FIG. 3 is a bottom view of the light guiding plate and the LEDs revealed in FIG. 2.

The LEDs 33 face the light-incident surface 312 of the light guiding plate 31. FIG. 2 only shows one LED 33. Referring to FIG. 3, the LEDs 33 of the backlight module 30 are located on a circuit board 34 and arranged in at least one column. Light emitted by the LEDs 33 enters into the bending portion 313 and then into the main portion 311. Light is finally emitted from the light-emitting surface 314 to provide backlight for the display panel 110. In the present embodiment, the main portion 311 of the light guiding plate 31 is located substantially in the display area 101. The LEDs 33 are not in the lower border 105 and do not occupy the lower border 105 (dislocated from the lower border 105). A portion of the bending portion 313 is in the lower border 105 and occupies the lower border 105.

The bending portion 313 provides total internal reflection of light which is incident on the bending portion 313. The bending portion 313 conducts the reflected light into the main portion 311. Except for the light-incident surface 312, all of other outer surfaces of the bending portion 313 are coated with a reflective coating 315, as shown in FIG. 2. The reflective coating 315 can be a metal or metallic coating. For example, a refractive index of the bending portion 313 of the light guiding plate 31 is in a range from 1.5 to 1.8, and the reflective coating 315 has a refractive index in a range from 1.2 to 1.5. The reflective coating 315 on the outer surfaces of the bent portion 313 (except for the light-incident surface 312 itself) causes total internal reflection by the bending portion 313. The manner of rendering a characteristic of total internal reflectivity to the bending portion 313 is not limited to the above-described manner.

Due to a light path in the bending portion 313 being curved, the bending portion 313 further has a function of rendering light output from the LEDs 33 more uniform. Thus, a uniform back lighting can be obtained and fed into the display area 101.

In one embodiment, each LED 33 emits light of one color. The LEDs 33 include three types emitting red light, blue light, and green light. The red light, blue light, and green light emitted by the LEDs 33 are mixed in the bending portion 313. In another embodiment, each of the LEDs 33 emits only blue light, and color conversion means and materials (such as quantum dots, phosphor, materials etc.) are dispersed in the bending portion 313, such that blue light of the LEDs 33 is converted into white light. In another embodiment, the bending portion 313 is made of material carrying quantum dots. That is, a quantum dot enhancement film (QDEF) is directly used as the bending portion 313, so that the bent portion 313 can convert a color of the light and conduct the light into the main portion 311.

In this embodiment, the transparent substrate 21 is flexible. For example, the transparent substrate 21 may be made of a transparent polyimide. As shown in FIG. 2, the transparent substrate 21 includes a base portion 211 that is flat and an extending portion 213 that is bent. The extending portion 213 extends from the base portion 211 toward a direction away from the color filter substrate 10. In this embodiment, a bending direction of the transparent substrate 21 is the same as a bending direction of the light guiding plate 31. The bending portion 313 and the extending portion 213 are located on same side of the liquid crystal display device 100. The base portion 211 is laminated on a side of the main portion 311 adjacent to the color filter substrate 10, and the extending portion 213 surrounds the bending portion 313. The color filter substrate 10, the base portion 211, the main portion 311, and the reflective sheet 35 are stacked orderly along a thickness direction of the liquid crystal display device 100.

As shown in FIG. 2, the liquid crystal display device 100 further includes a driving chip 40. The driving chip 40 is on the TFT substrate 20, more specifically is located on the extending portion 213 of the transparent substrate 21 of the TFT substrate 20. Thus, the driving chip 40 does not occupy the lower border 105. In this embodiment, the driving chip 40 is located on a side of the extending portion 213 away from the bending portion 313 and is adjacent to an end surface of the extending portion 213 away from base portion 211.

The driving chip 40 is electrically coupled to the TFTs located on the transparent substrate 21 and to other electrical components (not shown). These other electrical components may be a gate driving, a source driving, and a timing controller to drive the TFTs for example. In this embodiment, the transparent substrate 21 of the TFT substrate 20 is located substantially in the display area 101. The driving chip 40 is staggered from the lower border 105 and not occupying the lower border 105, a portion of the extending portion 213 of the TFT substrate 20 can be in the lower border 105.

Thus, light emitted from the LEDs 33 is guided to the main portion 311 of the light guiding plate 31 by the total internal reflection of the curved bending portion 313, and uniform light is emitted from the light-emitting surface 314 of the main portion 311. The light from the LEDs 33 is not wasted, and the LEDs 33 are not in occupation of the lower border 105.

In this embodiment, the main portion 311 and the bending portion 313 of the light guiding plate 31 are made of same flexible material and integrally formed. In other embodiments, the bending portion 313 is made of a flexible material, the main portion 311 is made of a rigid material, and the bending portion 313 is spliced on a side of the main portion 311.

In this embodiment, the base portion 211 and the extending portion 213 of the transparent substrate 21 are made of same flexible material and integrally formed. In other embodiments, the extending portion 213 is made of a flexible material, the base portion 211 is made of a rigid material, and the extending portion 213 is spliced on a side of the base portion 211. As shown in FIG. 2, the extending portion 213 is adjacent to and surrounds the bending portion 313.

In the liquid crystal display device 100, the curved light guiding plate 31 enables the location of the LEDs 33 to be other than in the lower border 105. The curved substrate 21 of the TFT substrate 20 allows the driving chip 40 to be located other than in the lower border 105. The liquid crystal display device 100 realizes a narrower, even no lower border 105 is required.

It is to be understood, even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present embodiments to the full extent indicated by the plain meaning of the terms in which the appended claims are expressed.

What is claimed is:

1. A liquid crystal display device, comprising:
    a display panel, the display panel comprising a thin film transistor (TFT) substrate, wherein the TFT substrate comprises a base portion that is flat and an extending portion curvedly extending from a side of the base portion, wherein a driving chip is positioned on the extending portion and electrically coupled to the TFT substrate;
    a backlight module, comprising:
        a light guiding plate, wherein the light guiding plate comprises a main portion that is flat and a bending portion curvedly extending from a side of the main portion, the main portion is laminated on a side of the base portion, the bending portion extends toward a direction away from the base portion, the bending portion and the extending portion are bend in a same direction and located on a side of the liquid crystal display device, an end surface of the bending portion away from the main portion is a light-incident surface of the light guiding plate, and a surface of the main portion facing and adjacent to the base portion is a light-emitting surface; and a plurality of light emitting diodes (LEDs) facing the light-incident surface.

2. The liquid crystal display device of claim 1, wherein except for the light-incident surface, all of other outer surfaces of the bending portion are coated with a reflective coating.

3. The liquid crystal display device of claim 2, wherein a refractive index of the bending portion is in a range from 1.5 to 1.8, and a refractive index of the reflective coating is in a range from 1.2 to 1.5.

4. The liquid crystal display device of claim 1, wherein the backlight module further comprises a reflective sheet on a side of the main portion away from the base portion.

5. The liquid crystal display device of claim 4, wherein the bending portion extends to a side of the reflective sheet away from the base portion.

6. The liquid crystal display device of claim 1, wherein the extending portion surrounds the bending portion.

7. The liquid crystal display device of claim 1, wherein the plurality of LEDs are located on a circuit board.

8. The liquid crystal display device of claim 1, wherein the driving chip is located on a side of the extending portion away from the bending portion and is adjacent to an end surface of the extending portion away from base portion.

9. The liquid crystal display device of claim 1, wherein the main portion and the bending portion are made of a same flexible material and integrally formed.

10. The liquid crystal display device of claim 1, wherein the bending portion is made of a flexible material; and the main portion is made of a rigid material.

11. The liquid crystal display device of claim 1, wherein the base portion and the extending portion are made of a same flexible material and integrally formed.

12. The liquid crystal display device of claim 1, wherein the extending portion is made of a flexible material; and the base portion is made of a rigid material.

* * * * *